(12) United States Patent
Birdwell et al.

(10) Patent No.: US 6,993,008 B2
(45) Date of Patent: Jan. 31, 2006

(54) MULTI-PACKET TRANSPORT STRUCTURE AND METHOD FOR SENDING NETWORK DATA OVER SATELLITE NETWORK

(75) Inventors: Kenneth J. Birdwell, Bellevue, WA (US); Brian Moran, Issaquah, WA (US); David Feinleib, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 09/755,877

(22) Filed: Jan. 5, 2001

(65) Prior Publication Data

US 2001/0024435 A1 Sep. 27, 2001

Related U.S. Application Data

(63) Continuation of application No. 08/728,066, filed on Oct. 9, 1996, now Pat. No. 6,172,972.
(60) Provisional application No. 60/018,527, filed on May 28, 1996.

(51) Int. Cl.
   *H04J 1/16* (2006.01)

(52) U.S. Cl. .................. 370/349; 370/345.1; 370/474.1
(58) Field of Classification Search ................ 370/349, 370/504, 447, 474, 471, 384, 345.1, 472, 370/470, 477, 401, 345, 465, 466, 469, 475, 370/476, 351, 352, 311, 316, 535, 537; 348/410, 348/384, 409, 716, 718; 714/746, 752
See application file for complete search history.

(56) References Cited

U.S. PATENT DOCUMENTS 4,962,498 A 10/1990 May, Jr. .................... 370/474

5,157,659 A 10/1992 Schenkel .................... 370/447

(Continued)

OTHER PUBLICATIONS

H. Jonathan Chao et al., "A Shared–Memory Virtual Channel Queue For ATM Broadband Terminal Adaptors", International Journal of Digital and Analog Communication Systems, vol. 5, 29–37 (1992).

(Continued)

*Primary Examiner*—Dang T Ton
(74) *Attorney, Agent, or Firm*—Lee & Hayes, PLLC

(57) ABSTRACT

A method for encoding network data, such as Internet Protocol (IP) data, into a format for transmission over a satellite system is described. The network data is configured in a packet having a data block and header information. The network data packet is encoded into a variable-length multi-packet transport (MPT) frame. The MPT frame comprises a data frame to hold data and header information. The IP packet in inserted its entirety into the data frame of the MPT frame. The variable-length MTP frame is then encoded into one or more fixed-length MTP packets. Each MPT packet has a data fragment block comprising a portion of the MTP frame and associated header information to designate what portion of the MTP frame is contained in the data fragment block. The MPT packets are sized to be embedded as a specific size payload of the satellite packet that is transmitted over a satellite network. Using this method, data received over a data network (i.e., Ethernet or Internet) in large network data packets are broken into smaller packets defined by the multi-packet transport. These smaller packets are then inserted as the data payload within standard fixed-size packets suitable for transmission across a particular distribution medium, such as satellite network. The network data remains independent of the underlying network and can be easily extracted at the receiver for use by computer applications.

6 Claims, 7 Drawing Sheets

U.S. PATENT DOCUMENTS

| | | | | |
|---|---|---|---|---|
| 5,610,918 | A | 3/1997 | Kamo et al. | 370/395 |
| 5,689,501 | A | 11/1997 | Takase et al. | 370/397 |
| 5,715,250 | A | 2/1998 | Watanabe | 370/466 |
| 5,764,645 | A | 6/1998 | Bernet et al. | 370/466 |
| 6,172,972 | B1 * | 1/2001 | Birdwell et al. | 370/349 |
| 6,804,254 | B1 * | 10/2004 | Pearce et al. | 370/467 |

OTHER PUBLICATIONS

D. Lutas et al., "Multiprocessor system for interconnections of Ethernet and FDDI networks using ATM via satellite", IEE Proc.—Computer Digit Tech. vol. 143, No. 1, Jan. 1996, pp. 69–78.

Robert J. Siracusa et al., "Flexible and Robust Packet Transport for Digital HDTV", IEEE Journal on Selected Areas in Communications, vol. 11, No. 1, Jan. 1993, pp. 88–98.

Tom Williams, Special Report: Set–Top Box Design, "STB operating systems gear up for flood of data services", Computer Design, Feb. 1996, No. 2 Tulsa, OK, pp. 67–80.

* cited by examiner

MULTI-PACKET TRANSPORT STRUCTURE AND METHOD FOR SENDING NETWORK DATA OVER SATELLITE NETWORK

RELATED APPLICATION

This application is a continuation of application Ser. No. 08/728,066, filed Oct. 09, 1996, now U.S. Pat. No. 6,172,972.

This application is based on Provisional Application No. 60/018,527, which was filed May 28, 1996, to which priority is claimed.

TECHNICAL FIELD

This invention relates to methods for sending computer network data, and particularly Internet Protocol (IP) data, over a satellite network. This invention also relates to a multi-packet transport structure that supports network data in packet sizes suitable for transmission over the satellite network, as well as other types of networks.

BACKGROUND OF THE INVENTION

Conventional satellite systems transmit data in standard size digital packets. As an example, one satellite network, referred to as the "digital satellite system" or "DSS" network, transmits data in 147-byte packets.

FIG. 1 shows a conventional DSS data packet 20. It has a three-byte header 22, a 127-byte payload 24, and a 17-byte trailer 26. The header 22 contains four flag bits, twelve addressing bits for the service channel identification number (SCID), four sequence bits, and four type bits. The payload 24 holds the actual data being transmitted. Trailer 26 contains forward error correction (FEC) information to help verify whether the packets are transmitted error free.

The data contained in each digital satellite packet resides in the 127-byte payload 24. One common use of DSS packets is to carry video and audio signals, such as those used in satellite-based television. Video and audio signals require continuous streaming of data at a particular rate to produce an even, uninterrupted presentation of images and sounds. To convert the continuous data stream into individual packets, the data stream is broken into equal-size blocks of 127 bytes. Each block is inserted into a payload 24 of a DSS packet 20. The individual packets are then transmitted over the satellite system to a user's residence. The data segments are extracted from the DSS packets and used to reconstruct the continuous data stream. These steps of packeting, transmitting, receiving, and reconstructing are carried out at a sufficiently high rate to enable the video/audio signals to be played in real time at the receiver's residence.

Within the networking community, data is likewise carried over data networks such as LANs (local area networks) and WANs (wide area networks) in discrete digital packets. One common and widely used type of network data is called Internet Protocol (IP) data. IP data defines a standard format for carrying data over essentially any underlying network, including the Ethernet and the Internet. The IP standard defines a packet used to encapsulate the data. The IP data is always encapsulated in this packet, regardless of the transmission network, enabling it to be carried over many different networks.

Conventional network data is typically encapsulated in packets that are much larger than 127 bytes. This presents a problem for satellite transmission because the size of a network data packet exceeds the payload size of a satellite packet, such as the 127-byte payload of DSS packet 20. Moreover, the size of the network data packet can vary dramatically. Hence, defining a formula for converting one type of packet directly to another type of packet is not particularly useful. The same problem persists for other network data formats in addition to IP and other satellite formats in addition to DSS.

It would be beneficial to provide a transport layer that enables variable-length network data packets to be carried in fixed-size satellite packet, as well as other types of network packets.

Another issue concerns use of the data after it is transmitted over the satellite network. Computer applications use standard sets of Application Programming Interfaces (APIs) to transmit and receive data over networks and over the Internet. For example, applications designed to run on Windows®-based operating systems employ a standard set of APIs that are defined in the Windows Sockets Specification, a well known specification. These APIs have been defined by industry committees and are widely in use. The Sockets APIs provide a network independent way to send and receive data, no matter what the underlying computer network (e.g., Ethernet, asynchronous transfer mode (ATM), etc.). Computer applications do not need to be specially written to receive data from a particular network. Instead, a developer writes code for an application that is interfaces to the Windows® Sockets API, enabling the application to send and receive data over a number of different networks supported by the computer's hardware.

It would be beneficial to devise a technique to repackage a network data packet, such as an IP data packet, into a format for compatible transmission over a satellite or other network system without losing the identify of the IP data packet. In this manner, the network data packet can be used by the computer application through a standard set of existing APIs, rather than through proprietary or non-standard functions known only to single monolithic client applications.

SUMMARY OF THE INVENTION

One aspect of this invention concerns a method for encoding network data, such as Internet Protocol (IP) data, into a format for transmission over a satellite system. The network data is configured in a packet having a data block and header information. As an example, an IP packet has a variable-length data block consisting of the IP data and a fixed-length header containing the IP header and a UDP (User Datagram Protocol) header.

According to the method, the network data packet is encoded into a variable-length multi-packet transport (MPT) frame. The MPT frame comprises a data frame and header information. The IP packet is inserted in its entirety into the data frame of the MPT frame.

The variable-length MPT frame is then encoded into one or more fixed-length MPT packets. Each MPT packet has a data fragment block comprising a portion of the MPT frame and associated header information to designate what portion of the MTP frame is contained in the data fragment block. In one implementation, the MPT packet header is a one-byte header which includes a start-of-frame bit and an end-of-frame bit. These two bits designate whether the data contained in the associated data fragment block of the MTP packet is the starting portion of the MPT frame, the ending portion of the MPT frame, or a middle portion of the MPT frame. More particularly, the start-of-frame bit is set if the data fragment block contains the starting portion of the MTP frame. The end-of-frame bit is set if the data fragment block contains the ending portion of the MTP frame. Both bits are reset if the associated data fragment block contains the middle portion of the MPT frame. In this manner, the header information helps re-assembly of the data fragments into the MPT frame.

The MPT packets are a size appropriate for transmission over the satellite system. In one implementation, the MPT packets are sized to 127 bytes. At this size, the entire MPT packet is embedded into the 127-byte payload of a conventional 147-byte DSS packet.

Using this method, data received over a data network (i.e., Ethernet or Internet) in large network data packets are broken into smaller packets defined by the multi-packet transport. These packets are then placed as the data payload within standard, fixed-size packets suitable for transmission across a particular distribution medium, such as the DSS network. The network data remains independent of the underlying network and can be easily extracted at the receiver for use by computer applications.

According to another aspect, a method for decoding computer network data from a satellite transmission signal is described. The satellite packets are received at a user-based receiving unit. The data payloads are removed from the satellite packets. Each data payload has the fixed-length multi-packet transport (MPT) packet, which comprises the data fragment block and associated header information. The decoding unit uses the header information of the MPT packet to arrange the MPT packets into a variable-length MPT frame. The MPT frame is then reconstructed from the data fragment blocks of the MPT packets and the network data is extracted from the reconstructed MPT frame.

In this manner, network data is transmitted using conventional satellite packets without losing its known format. A computer application at the user-based receiving unit can use standard APIs, such as those prescribed by the Windows Sockets Specification, to call and access the network data. By encapsulating whole IP network data within satellite packets, content distributors will enable a wide new range of applications. Applications developers will find it easy to make use of such data since they will be writing to a standard interface with which they are already familiar.

DETAILED DESCRIPTION OF THE PREFERRED EMBODIMENT

Figure 2:
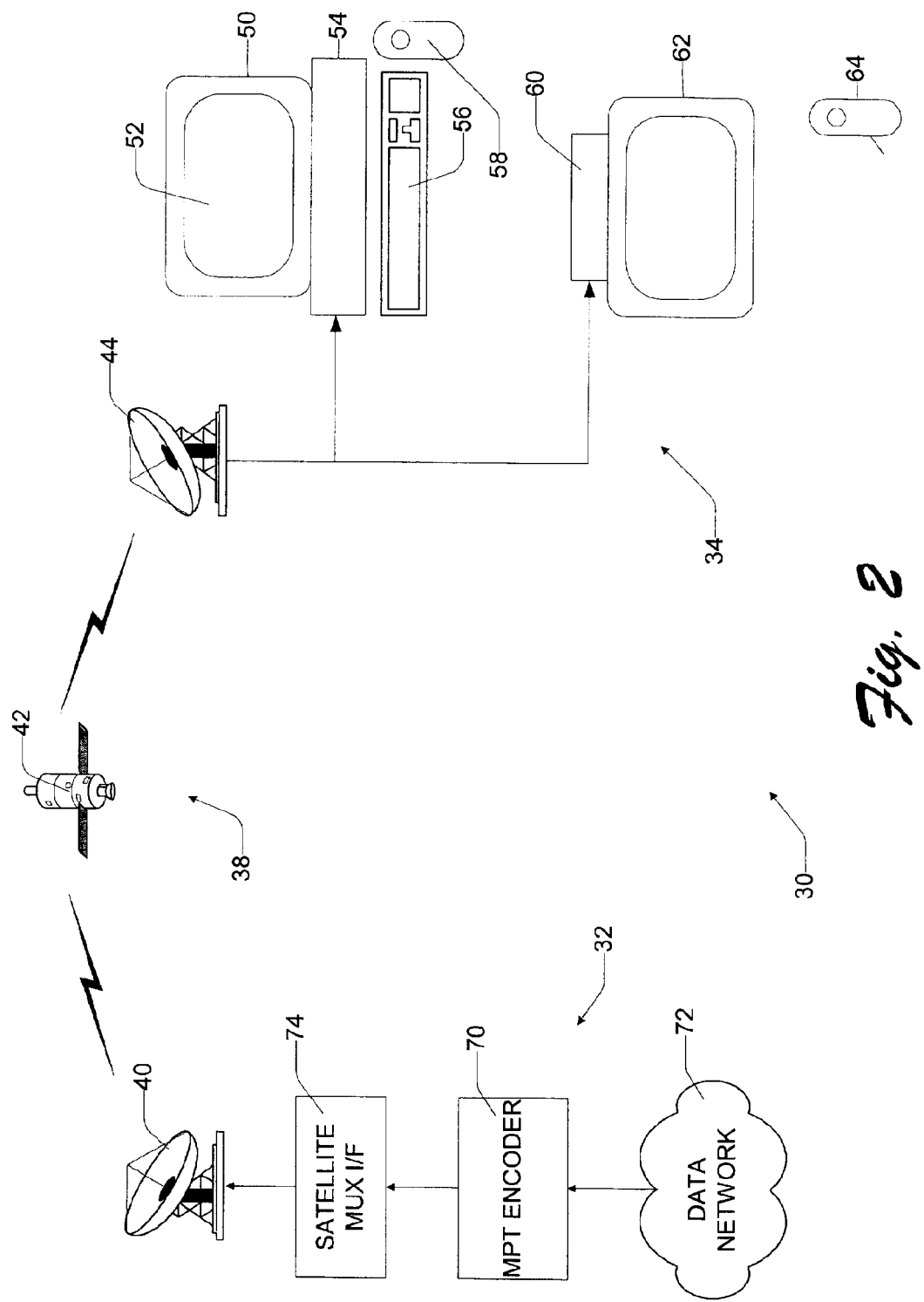
FIG. 2 is a diagrammatic illustration of a satellite transmission system.

FIG. 2 shows a satellite transmission system 30 for delivering signals from a content provider 32 (e.g., cable headend, television broadcast station, Internet service provider, etc.) to a receiver residence 34 over a satellite network 38. The satellite network 38 includes a satellite transmitter 40 located at the content provider 32. The satellite transmitter 40 transmits signals in the form of individual digital packets to an orbiting satellite 42, which retransmits the digital packets back to a satellite receiver 44 located at the receiver's residence. One example of a suitable satellite network 38 is a digital satellite system (DSS) network which transmits video and audio signals from a content provider to individual satellite receivers located at subscriber homes. In a DSS network, the satellite receiver 44 is a small, 18-inch dish that is capable of receiving the satellite-transmitted signals. The DSS network supports satellite-broadcast television shows, movies, games, and the like.

More generally, the satellite signals can contain many different data types, including video, audio, animation, textual, and the like. In the illustrated implementation, the satellite signals are sent from the satellite receiver 44 to one of two different kinds of display units at the receiver residence 34. One display unit is embodied as a broadcast enabled personal computer 50, or simply "broadcast PC." The broadcast PC 50 has a large VGA monitor 52, a processing unit 54, and input devices in the form of remote keyboard 56 and remote control handset 58. The remote keyboard 56 and handset 58 are remotely coupled to the processing unit 54 via a wireless data link, such as infrared (IR) or radio (RF). Other types of input devices (e.g., mouse, track ball, stylus, etc.) can be used instead of, or in addition to, the keyboard and handset.

The other display unit is embodied as a set-top box 60 coupled to a conventional television 62. A remote control handset 64 is used to remotely control the set-top box and television via a wireless data link. In another embodiment, the functionality in the set-top box 60 can be incorporated into the television 62.

Content provider 32 is configured to package the signals in fixed-size digital packets. As an example, a DSS packet has a size of 147 bytes, as described in the Background of the Invention section with respect to FIG. 1. The content provider 32 includes a encoding unit for encoding network data packets into a format for transmission over the satellite system 38. In the illustrated implementation, the encoding unit at the content provider includes a multi-packet transport (MPT) encoder 70 coupled to a data network 72, such as an Ethernet or the Internet. The MPT encoder 70 receives network data packets (e.g., TCP/IP packets or UDP/IP packets) from the data network 72, wraps them in an MPT frame format, and then splits the MPT frame into MPT packets that are suitably sized for satellite transmission. As one example, the MPT encoder can be implemented as a network router. The MPT frame and packet structures are described below in more detail. The MPT packets are passed to a satellite MUX (multiplexor) interface 74 where they are encoded into satellite-transmissible packets. The satellite packets are then uplinked to the satellite transmitter 40.

Figure 3:
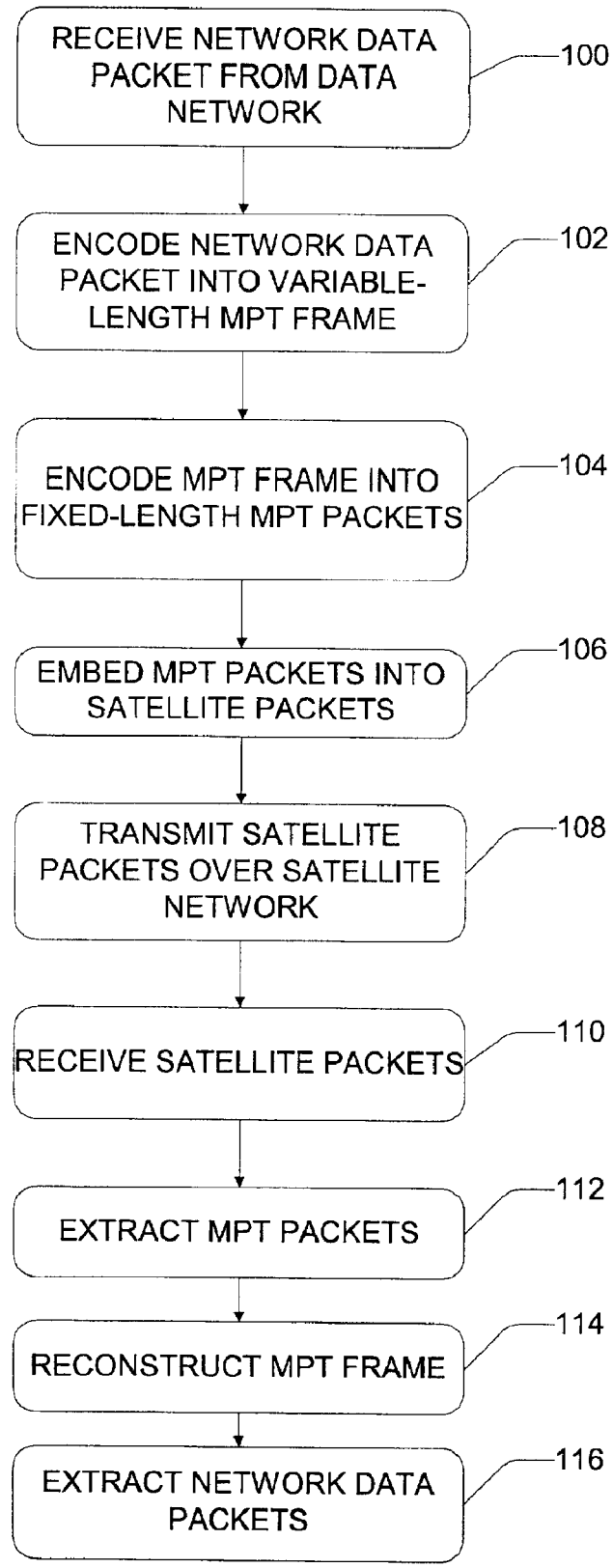
FIG. 3 is a flow diagram of a method for sending network data over the satellite transmission system.

FIG. 3 shows a method for operating the satellite transmission system 30 to carry network data as part of the satellite transmission. This method will be described with reference to FIGS. 2 and 4–7.

At step 100, the MPT encoder 70 receives a network data packet from the data network 72. As an example, the network data packet is in the form of an Internet Protocol (IP) packet, although other forms of packets may be used.

Figure 4:
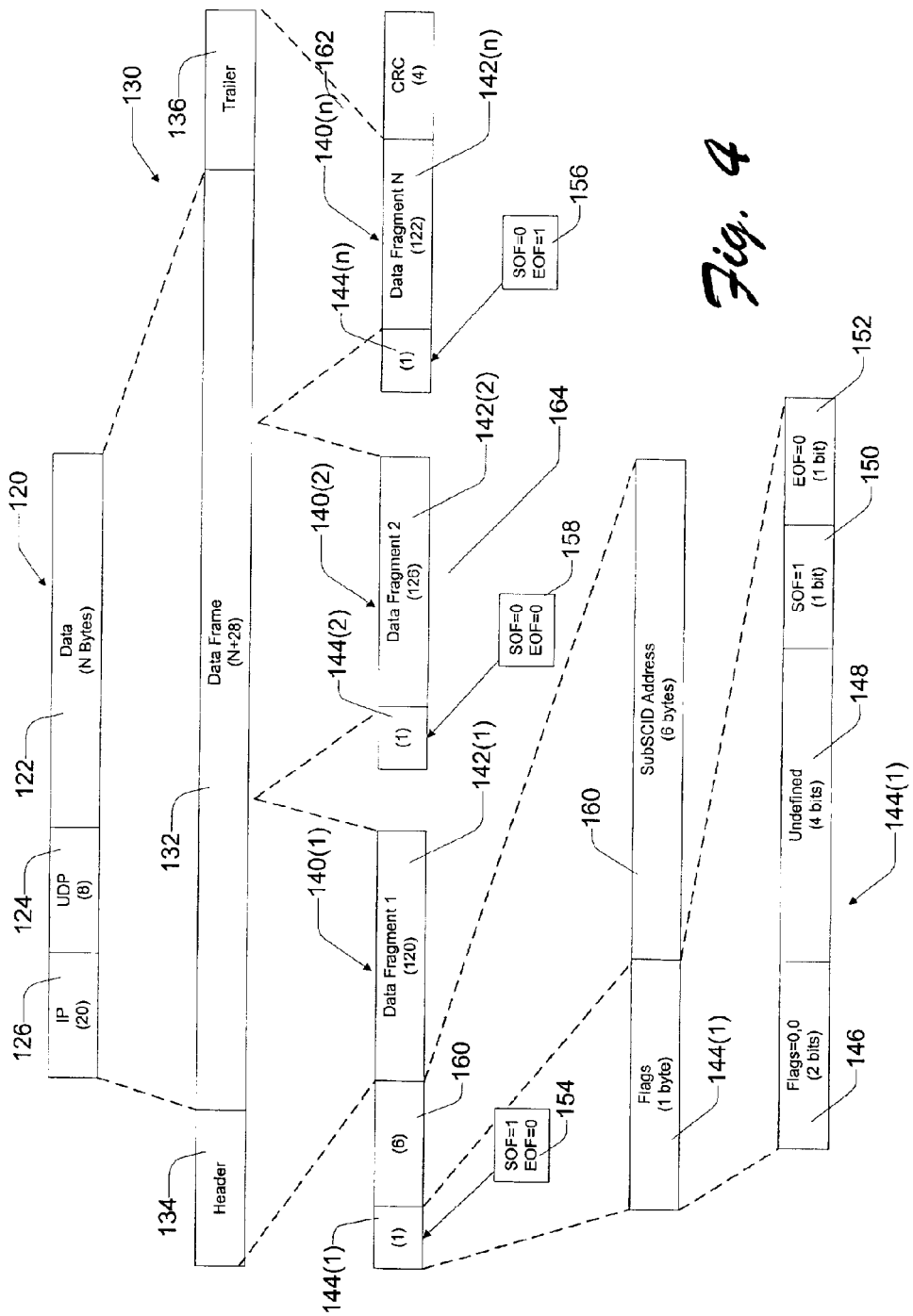
FIG. 4 is a diagrammatic illustration of a multi-packet transport (MPT) structure used to carry network data.

FIG. 4 shows an IP packet 120. It has a variable-length (N-byte) data payload 122, a fixed-length (A-byte) transport protocol header 124, and a fixed-length (B-byte) IP header 126. The data payload 122 contains the actual network data. The transport protocol header 124 designates the transport layer protocols for the data network. Examples of the transport protocol include Transmission Control Protocol (TCP) and User Datagram Protocol (UDP). In FIG. 4, the IP packet 120 has a UDP header 124 that is eight bytes in length. The IP header 126 provides the addressing information necessary to deliver the data from source to destination. In this example, the IP header 126 is 20 bytes in length.

At step 102 in FIG. 3, the MPT encoder 70 encodes the network data packet into a variable-length MPT frame 130. The MPT frame 130 has a variable-length (M-byte) data block or data payload 132 and a fixed-length (C-byte) type header 134. The IP packet 120 is inserted in its entirety (including both headers) into the data payload 132 of the MPT frame. As an example implementation, the header 134 contains a two-byte protocol identifier, which for IP data, has a value of 0x0800. The header 134 might also contain optional bytes for designating protocol options.

The MPT frame 130 might also have a trailer 136 attached to the data payload 132. The trailer 136 includes one or more optional padding bytes 136 which bring the total number of bytes for the last portion of the MPT frame 130 to a size suitable for insertion into a fixed-size MPT packet, as is be described below in more detail. The trailer 136 might also designate space for further use, as well as length data that specifies the length of the actual data frame 132 and the optional bytes for protocol options.

At step 104 of FIG. 3, the MPT encoder 70 encodes the variable-length MPT frame 130 into one or more fixed-length MPT packets 140(1), 140(2), . . . , 140(n). In the illustrated implementation, each MPT packet 140 consists of 127 bytes. Each MPT packet has 140 a data block 142, which can vary in size depending upon the packet contents, and at least a flag header 144.

During encoding, the MPT frame 130 is broken into data fragments which form the data fragment blocks 142(1), 142(2), . . . , 142(n) of the MPT packets 140(1), 140(2), . . . , 140(n). The flag headers 144(1), 144(2), . . . , 144(n) are then attached to the front of the corresponding the data fragment blocks 142(1), 142(2), . . . , 142(n). In the illustrated implementation, each flag header 144 has a size of one byte. The flag header 144 contains two flag bits 146, four undefined bits 148, one start-of-frame (SOF) bit 150, and one end-of-frame (EOF) bit 152. The SOF bit and EOF bit are the least significant bits of the flag header.

The SOF and EOF bits 150 and 152 designate whether the data fragment from the MPT frame that is contained within the corresponding data block 142 is a starting portion of the MPT frame, an ending portion of the MPT frame, or a middle portion of the MPT frame. More particularly, SOF bit 150 is set if the corresponding data fragment 142 is from the starting portion of the MTP frame 130. The EOF bit 152 is set if the data fragment 142 is from the ending portion of the MTP frame 130. Both the SOF and EOF bits are reset if the data fragment is from the middle portion of the MPT frame 130.

In FIG. 4, MPT packet 140(1) is an example leading packet containing the starting data fragment of the MPT frame 130. Accordingly, the SOF bit is set to binary "1" and the EOF is reset to binary "0" as represented by box 154. The last MPT packet 140(n) is an example ending packet which contains the ending data fragment of the MPT frame 130. As a result, the SOF bit is reset to binary "0" and the EOF is set to binary "1" as represented by box 156. MPT packet 140(2) is an example middle packet which contains a middle data fragment of the MPT frame 130, and hence, both the SOF and EOF bits are reset to binary "0" as represented by box 158.

The leading MPT packet 140(1) has an address header 160 positioned before the data block 142(1). In the example implementation, the address header 160 consists of a six-byte value. This is used in combination with the existing service channel identification number (SCID), and is known as a "sub-SCID." As a result, the leading MPT packet 140(1) comprises a one-byte flag header 144(1), a six-byte address header 160, and a 120-byte data block 142(1).

The last MPT packet 140(n) has an error correction trailer 162 containing error correction data positioned after the data block 142(n). As an example, the error correction trailer 162 contains a 32-bit CRC (cyclic redundancy check) value that is computed for all preceding MPT packets 140(1)–140(n), which is represented as the bytes within dashed box 164. CRC error checking is a procedure used to check for errors in data transmission. It involves a complex calculation to generate a value based upon the data being transmitted. A CRC value is computed at the transmitter and attached as part of the transmitted packet. The receiver repeats the calculation and compares it to the attached CRC value. If the receiver's calculation and the attached CRC value match, the transmission of data is assumed to be error-free. CRC is well known and widely used. It is noted that other types of error correction values can be alternatively employed.

The last MPT packet 140(n) thus comprises a one-byte flag header 144(n), a 122-byte data block 142(n), and a flour-byte error correction trailer 162. All middle MPT packets 140(2), . . . , 140(n–1) comprise a one-byte flag header 144 and a 126-byte data block 142.

Table 1 summarizes four possible packet types depending upon the values of the SOF and EOF bits of the flag byte header.

| SOF | EOF | Description |
|---|---|---|
| 1 | 0 | The first packet of a multi-packet MPT frame. The six bytes following the flag header are the sub-SCID address, followed by 120 bytes of fragment data. The CRC is accumulated on all bytes of this packet. |
| 0 | 0 | An intermediate (neither the first, nor last) packet of a multi-packet MPT frame. 126 bytes following the flag byte are fragment data. The error correction information is accumulated on all bytes of this packet. |
| 0 | 1 | The last packet of a multi-packet MPT frame. The flag header is followed by 122 bytes of data and 4 bytes of error correction information. The error correction information is accumulated on the first 123 bytes of this packet. |
| 1 | 1 | The first, last, and only packet of a single-packet MPT frame. The six bytes following the flag header are the sub-SCID address, followed by 116 bytes of data, followed by four bytes of error correction information. The error correction information is accumulated on the first 123 bytes of this packet. |

At step 106 of FIG. 3, the satellite MUX interface 74 embeds the MPT packets 140 into fixed-length satellite packets for transmission over the satellite network 38. For purposes of continuing discussion, this step is described in the context of DSS data packets, which have a fixed length of 147 bytes.

Figure 1:
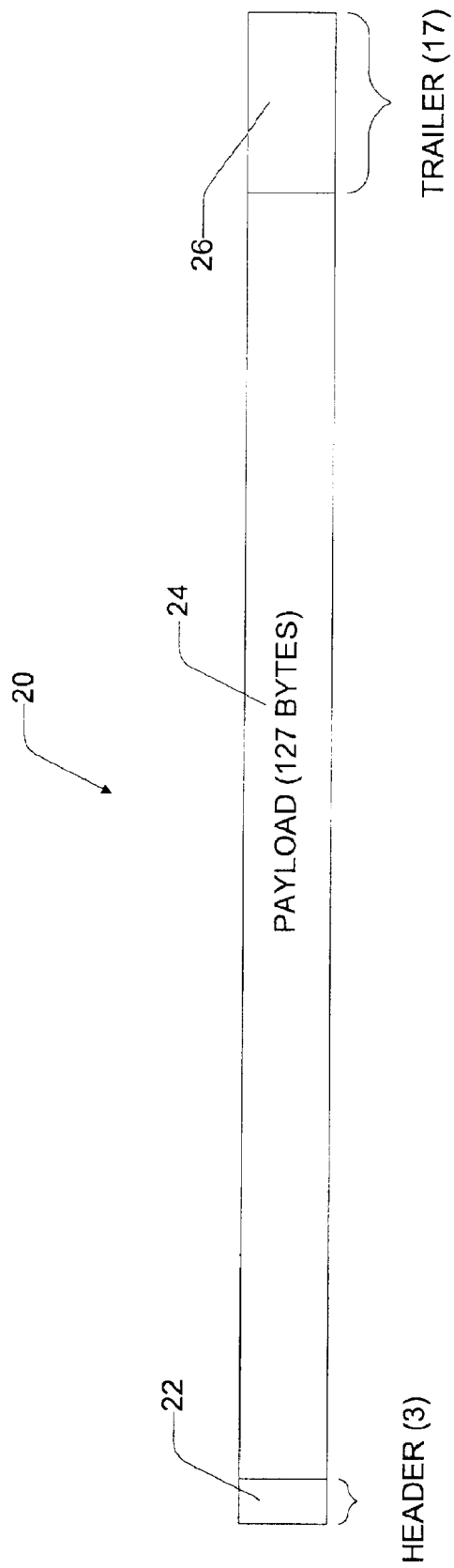
FIG. 1 is a diagrammatic illustration of a prior art digital satellite system (DSS) packet structure.
Figure 5:
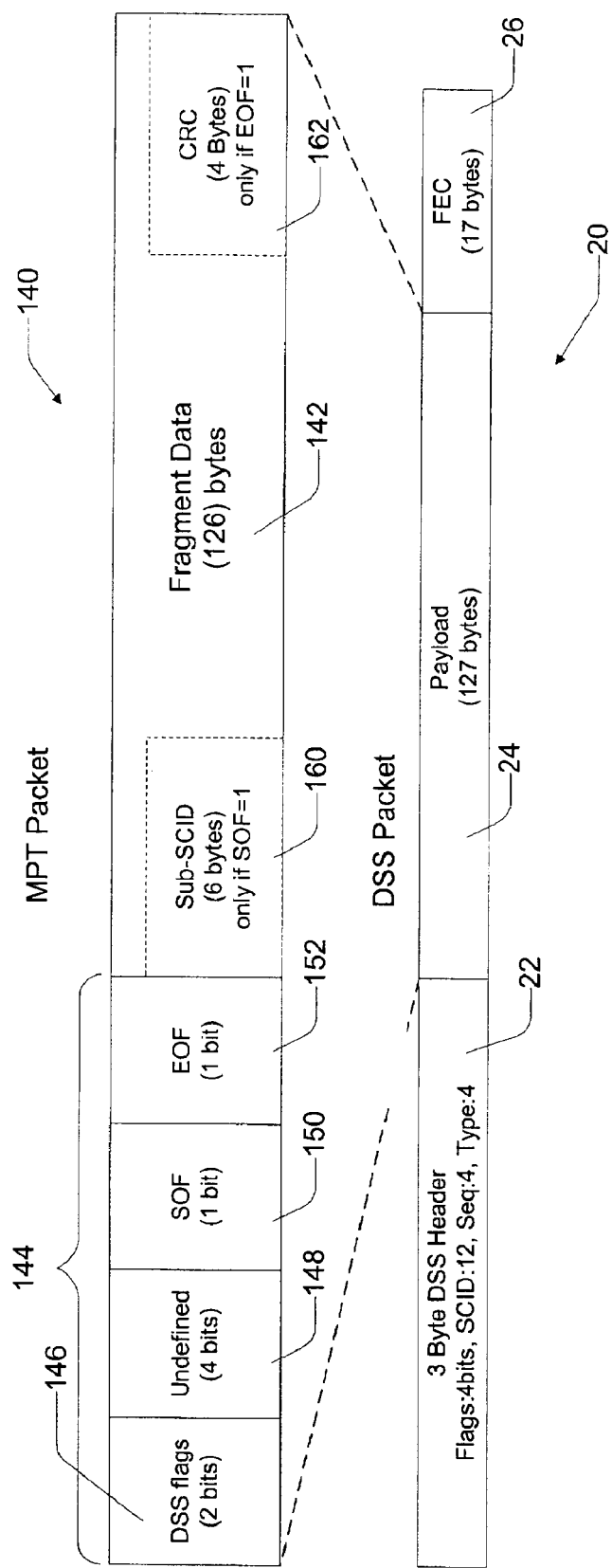
FIG. 5 is a diagrammatic illustration of an MPT packet embedded within a satellite-transmissible DSS packet.

FIG. 5 shows an MPT packet 140 and its relationship to a 147-byte DSS packet 20, which is the same packet as described with respect to FIG. 1. In this implementation, the first two flag bits 146 of flag header 144 are set to zero to represent a DSS packet format. The entire 127-byte MPT packet 140 is inserted into the 127-byte data payload 24 of the conventional DSS packet 20. A three-byte DSS header 22 is attached to the front of the data payload 24. The header 22 contains four flag bits, twelve addressing bits for the service channel identification number (SCID), four sequence bits, and four type bits. A 17-byte trailer 26 is attached to the end of the data payload 24 and contains forward error correction (FEC) information computed according to conventional techniques.

It is noted that the MPT encoder 70 can be implemented in hardware, software, or a combination hardware/software. In hardware, the network data packet received from the data network 72 is initially placed in a register. A header 134 and optional padding 136 are added to form the MPT frame 130, which is stored in another register. The MPT frame 130 is then passed to a shift register in the MPT encoder 70. The first 120 bytes are shifted out and a one-byte flag header 144 and six-byte address header 160 are added thereto to form a leading MPT packet 140(1). The leading MPT packet 140(1) is stored in a separate register. Thereafter, the MPT frame 130 is shifted out 126 bytes at a time, with a flag header 144 being added to each, to form the middle MPT packets 140(2), ..., 140(n−1). When the end of the MPT frame 130 is reached, the last data bytes are shifted out and a one-byte flag header 144(n) is added to form the last MPT packet 140(n). A CRC value is then computed using all MPT packets stored in the various registers. The CRC value is attached as a four-byte trailer 162 to the last MPT packet 140(n).

In a software implementation, the network data packet is cached in memory. The MPT frame header and padding are wrapped around the network data packet. The software then segments the MPT frame into appropriately sized data fragments and adds the flag header. The address header is added to the first MPT packet. The software then computes a CRC value and attaches it as a trailer to the last MPT packet.

At step 108 in FIG. 3, the satellite packets are transmitted from the content provider 32 over the satellite network 38 to the receiver residence 34. The DSS packets are transmitted on multiple SCIDs and the satellite receiver 44 supports reception on the multiple SCIDs simultaneously. The satellite receiver 44 supports wideband packet synchronization (i.e., a technique for processing data received from the satellite network) to discover boundaries of the DSS packets.

As the satellite receiver 44 receives the satellite packets (step 110 in FIG. 3), it uses the last 17 bytes to perform an FEC (forward error correction) analysis to ensure that the DSS packet is intact. The satellite receiver 44 then filters the DSS packets using the SCID address in the first three bytes of the 147-byte DSS packet. Unwanted packets are discarded. The acceptable packets are passed to a decoding unit which is implemented as part of the satellite receiver, and preferably in software.

Figure 6:
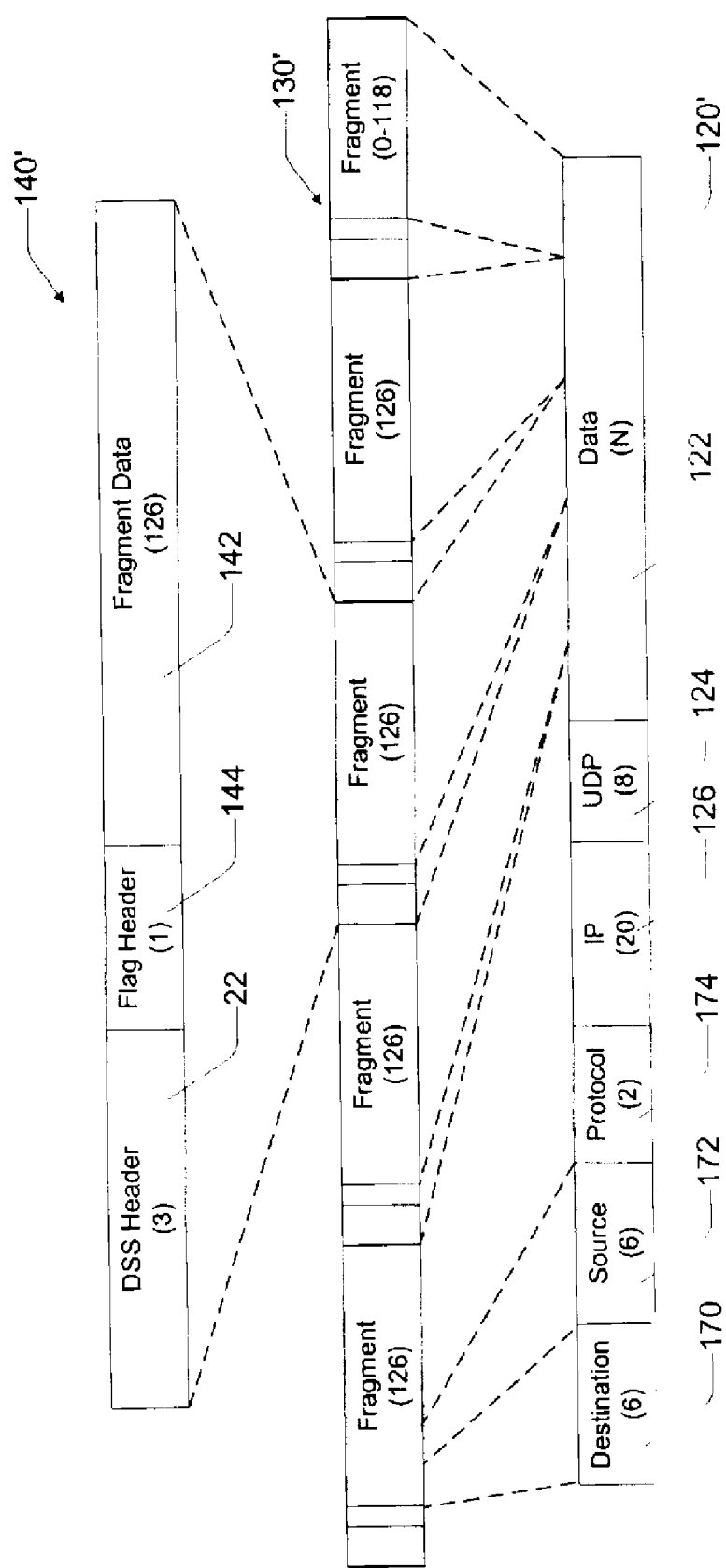
FIG. 6 is a diagrammatic illustration of various packet structures showing re-assembly of the network packets from the MPT packets.

FIG. 6 shows the intermediate data structures during re-assembly of the network data packet within the satellite receiver, and its conversion into a packet which conforms to the Ethernet Protocol. The satellite receiver 44 first strips the 17-byte FEC trailer from the satellite packet to extract the MPT packet (step 112 in FIG. 3). The three-byte DSS packet header 22 may or may not remain as part of the extracted MPT packet 140'. After the SCID address is used to initially group and filter the DSS packets, the information contained in the three-byte DSS packet header becomes irrelevant and can therefore be dropped.

The MPT packet 140' has intact the flag header 144 (and address header for the first packet), as well as the fragment data in the data block 142. The satellite receiver filters unwanted MPT packets using the sub-SCID addresses contained in the leading MPT packet. The sub-SCID addresses are 48 bits long, and are positioned as the fourth through ninth bytes in the MPT packet. The sub-SCID addresses are synchronized across the SCIDs used to transmit the MPT packets, but filtering on the sub-SCID addresses is performed without regard to the SCID for the satellite packet.

In an example embodiment, the satellite receiver filters on at least 16 different sub-SCIDs simultaneously. Unwanted MPT packets are discarded, while the MPT packets with the appropriate sub-SCID addresses are kept. It is desirable to filter on as many sub-SCIDs as possible. Many broadcast data satellite systems are capable of filtering on 32 different sub-SCIDs. Additionally, the satellite receiver should also support a "promiscuous" mode, in which it does not filter any sub-SCIDs; rather packets from all selected SCIDs pass through. For efficiency and throughput, the sub-SCID addresses are capable of being loaded within 10 ms and being disabled and enabled with a single operation.

At step 114 in FIG. 3, the decoding unit at the satellite receiver reconstructs the MPT frame 130' from multiple MPT packets 140' (FIG. 6). The flag header of each MPT packet is read to determine whether it is the lead MPT packet (e.g., SOF=1, EOF=0), a middle MPT packet (e.g., SOF=0, EOF=0), or the last packet (e.g., SOF=0, EOF=1).

The following is an example of an IP data packet being carried by MPT packets to illustrate byte order and outputs. In the examples below, data is represented exactly as it arrives from the satellite network, as well as how it is stored in memory, byte per byte. Example 1 is for a single packet MPT frame.

| 3F | 00 | 00 | E9 | 24 | 18 | 24 | 08 | 00 | 45 | 00 | 00 | 61 | 99 | 01 | 00 |
| 00 | 20 | 11 | 41 | 60 | DF | DF | DF | 02 | E9 | 24 | 18 | 24 | 27 | 06 | 27 |
| 0F | 00 | 4D | 00 | 00 | 74 | 68 | 69 | 73 | 20 | 69 | 73 | 20 | 74 | 65 | 73 |
| 74 | 2C | 20 | 69 | 74 | 27 | 73 | 20 | 66 | 72 | 6F | 6D | 20 | 32 | 32 | 33 |
| 2E | 32 | 33 | 33 | 2E | 32 | 32 | 33 | 2E | 30 | 32 | 3A | 39 | 39 | 39 | 30 |
| 20 | 73 | 65 | 6E | 74 | 20 | 74 | 6F | 20 | 32 | 33 | 33 | 2E | 33 | 36 | 2E |
| 32 | 34 | 2E | 33 | 36 | 3A | 39 | 39 | 39 | 39 | 00 | 00 | 00 | 00 | 00 | 00 |
| 00 | 00 | 00 | 00 | 00 | 00 | 00 | 00 | 01 | 00 | 63 | 4B | B1 | B9 | A9 | |

The first byte "3F" is the flag header, and the "F" value indicates that both the SOF and EOF bits are set to "1". Accordingly, the MPT packet has both an address header and a CRC trailer.

Example 2 is for a mult-packet MPT frame. In this example, the MPT frame contains two packet.

| 3E | 00 | 00 | E9 | 24 | 18 | 24 | 08 | 00 | 45 | 00 | 00 | B1 | 99 | 02 | 00 |
|----|----|----|----|----|----|----|----|----|----|----|----|----|----|----|----|
| 00 | 20 | 11 | 41 | 0F | DF | DF | DF | 02 | E9 | 24 | 18 | 24 | 27 | 06 | 27 |
| 0F | 00 | 9D | 00 | 00 | 74 | 68 | 69 | 73 | 20 | 69 | 73 | 20 | 61 | 20 | 74 |
| 65 | 73 | 74 | 20 | 6F | 66 | 20 | 20 | 61 | 20 | 73 | 74 | 72 | 69 | 6E | 67 |
| 20 | 74 | 68 | 61 | 74 | 20 | 69 | 73 | 20 | 6C | 6F | 6E | 67 | 65 | 72 | 20 |
| 74 | 68 | 61 | 6E | 20 | 61 | 20 | 73 | 69 | 6E | 67 | 6C | 65 | 20 | 70 | 61 |
| 63 | 6B | 65 | 74 | 2C | 20 | 61 | 73 | 20 | 6C | 65 | 61 | 73 | 74 | 20 | 49 |
| 20 | 74 | 68 | 69 | 6E | 6B | 20 | 69 | 74 | 27 | 73 | 20 | 6C | 6F | 6E |    |
| 3D | 67 | 65 | 72 | 20 | 74 | 68 | 61 | 6E | 20 | 61 | 20 | 73 | 69 | 6E | 67 |
| 6C | 65 | 20 | 70 | 61 | 63 | 6B | 65 | 74 | 2C | 20 | 77 | 65 | 6C | 6C | 2C |
| 20 | 6A | 75 | 73 | 74 | 20 | 61 | 62 | 6F | 75 | 74 | 2C | 20 | 69 | 74 | 20 |
| 73 | 75 | 72 | 65 | 20 | 69 | 73 | 20 | 6E | 6F | 77 | 2E | 00 | 00 | 00 | 00 |
| 00 | 00 | 00 | 00 | 00 | 00 | 00 | 00 | 00 | 00 | 00 | 00 | 00 | 00 | 00 | 00 |
| 00 | 00 | 00 | 00 | 00 | 00 | 00 | 00 | 00 | 00 | 00 | 00 | 00 | 00 | 00 | 00 |
| 00 | 00 | 00 | 00 | 00 | 00 | 00 | 00 | 00 | 00 | 00 | 00 | 00 | 00 | 00 | 00 |
| 00 | 00 | 00 | 00 | 00 | 00 | 00 | 02 | 00 | B3 | 13 | C4 | 95 | B1 |    |    |

The flag header in the first packet is "3E" which indicates that the least significant bit (i.e., the EOF bit) is a "0" and the next least significant bit (i.e., the SOF bit) is a "1". Such EOF and SOF bit values indicate that the first packet is a lead MPT packet. The flag header of "3D" in the second packet establishes a SOF=0 and EOF=1, indicating that the second packet is a last MPT packet.

As the MPT packets are being arranged beginning with the lead MPT packet, the satellite receiver begins compiling a CRC value. Multi-Packet CRCs are used to detect dropped packets, as well as packets that make it through the FEC analysis yet contain undetected errors. Under most circumstances, packets arriving from the satellite network with errors are detected by the FEC analysis, and appropriate action is taken. In some circumstances, however, packets arrive containing too many errors for the FEC to correct, and the errors occur in such a way that the FEC mistakenly reports that all errors have been corrected. This occurrence happens at a rate of 1/N! where N is the number of bytes that can be corrected. For the DSS system, the probability of not detecting that condition and falsely reporting a valid packet are 2.48E-5. A much lower error rate of under 2.07E-17 is desired. The 32-bit CRC value provided for each MPT frame is suitable for signal conditions at "video threshold," and will achieve the strict error rate.

The satellite receiver accumulates the CRC across multiple packets. The CRC calculation is independent of sub-SCID filtering. The last MPT packet is reached when the EOF in the flag header is set to "1". The CRC is accumulated for all bytes in the MPT frame 130', excluding the 4-byte trailer 162 containing the CRC value. The CRC value thereby includes flag headers, data fragments, and the 6-byte sub-SCID address of the first MPT packet. This corresponds to the fourth through $130^{th}$ bytes of each DSS packet (except the one containing the last MPT packet) received at the satellite receiver. The CRC is accumulated in order, byte per byte, from each DSS packet.

When the EOF condition is detected, the calculated CRC value is compared to the CRC value attached as trailer 162 in the last MPT packet. As an example, the CRC value in the MPT packet is stored in the Network Byte Order format, which is also called "Big Endian." This means that the most significant byte of the CRC is contained in the first byte of the CRC trailer 162 (i.e., the $127^{th}$ byte of the DSS packet) and the least significant byte of the CRC is contained in the last byte of the CRC trailer 162 (i.e., the $130^{th}$ byte of the DSS packet). A match of the CRC computed by the satellite receiver and the CRC attached as the four-byte trailer 162 in the last MPT packet evidences an error-free transmission.

In one implementation, the satellite receiver may support only one CRC accumulator to compute the CRC value. MPT packets belonging to different MPT frames (and hence having differing sub-SCIDs) are not interleaved. Packets for the next MPT frame are taken after the last MPT packet for the previous MPT frame is reached. On the other hand, in another implementation where the satellite receiver supports MPT packet reception on multiple SCIDs, each SCID might have a corresponding CRC accumulator, one for each MPT packet in the process of being received. Multiple CRC accumulators are useful as there may not be any way to synchronize starting and stopping multiple MPT frames between SCIDs.

As an example implementation, the CRC algorithm used by a DSS-compatible satellite receiver is the same CRC algorithm as used by the MPEG-2 Transport stream as defined in the standard ISO/IEC 13818-1. The algorithm consists of the polynomial:

$$1+D+D^2+D^4+D^5+D^7+D^8+D^{10}+D^{11}+D^{12}+D^{16}+D^{22}+D^{23}+D^{26}+D^{32}$$

As in the ISO/IEC 13818-1 specification, the initial state of the sum is 0xFFFFFFFF. This is not the same algorithm used by Ethernet.

In the above discussion, the CRC calculation is performed by the satellite receiver. Alternatively, the CRC calculation can be computed by a processor in the visual display units. This is described below in more detail. Performing the CRC calculations using the processor, however, consumes a high amount of the available computational resources. Accordingly, it is preferred that the CRC be performed by the satellite receiver.

If the CRC analysis is favorable, the next step 116 of FIG. 3 is to extract the network data packet 120' from the MPT frame 130'. In the continuing example, the IP packet 120' has intact the N-byte data payload 122, the 8-byte UDP header 124, and the 20-byte IP header 126. To ensure that the IP packet 120' conforms to the Ethernet Protocol, the sub-SCID address header 160 found in the first MPT packet 140(1) is placed in the beginning of the IP packet as a network destination address 170 (e.g., an Ethernet Destination address). A network source address 172 is filled with a fixed, valid source address (e.g., an Ethernet Source address). A two-byte protocol 174 is filled with the protocol from header 134 of the MPT packet 130', without modification. Any protocol options from header 134 is appended to the IP packet 120' as well as all subsequent MPT packets until an EOF condition is met.

Once the EOF condition is met, the CRC is checked as described above, and if the comparison was successful, the true length of the data is recorded, the simulated IP packet is written to the memory of the visual display unit, and the visual display unit is notified that an IP packet has arrived.

An alternate method would be when the network data packets are reassembled within the processor of the visual display unit. The MPT packets are written into main memory in the order in which they arrive. The entire MPT packet 140' is written to memory. In order to enhance performance, rather than writing out a packet stream of 127 byte MPT packets, the packets are aligned on 128-byte blocks. The first byte is written in the form of padding or internal flags, which can be used by the satellite receiver card for whatever internal purpose. For purposes of network data reconstruction, however, this first byte is considered as "don't care." The remaining 127 bytes include the flag and address headers 144, 160 (if a first packet; otherwise just the one-byte flag header), and a data block 142 holding the data fragment. Memory buffers are preferably configured in multiples of 128 bytes. MPT Packets are written to align on four-byte double word or "DWORD" boundaries. By writing the MPT packets in this way, and by aligning bytes on predicable DWORD boundaries, software running on common processors can be optimized to a higher degree than would be possible by not aligning the data.

Even in the case where the visual display unit performs re-assembly, it is preferred that the satellite receiver perform the CRC calculations. This is desired due to the computational burden of requiring the video display unit to perform these calculations. The video display unit is needed to perform time critical user interface tasks as well as other data processing tasks and any unnecessary burden is noticed.

The satellite receiver determines whether the CRC failed by including the CRC bytes in the CRC calculations and writing the result in place of the original CRC bytes. If the CRC value that was calculated over the original data is fed through the CRC algorithm as an additional four bytes, the new CRC result will have the value of zero upon success, and non-zero upon failure.

The video display unit then performs the same operations as the satellite receiver in order to create an packet that conforms to the IP packet.

Figure 7:
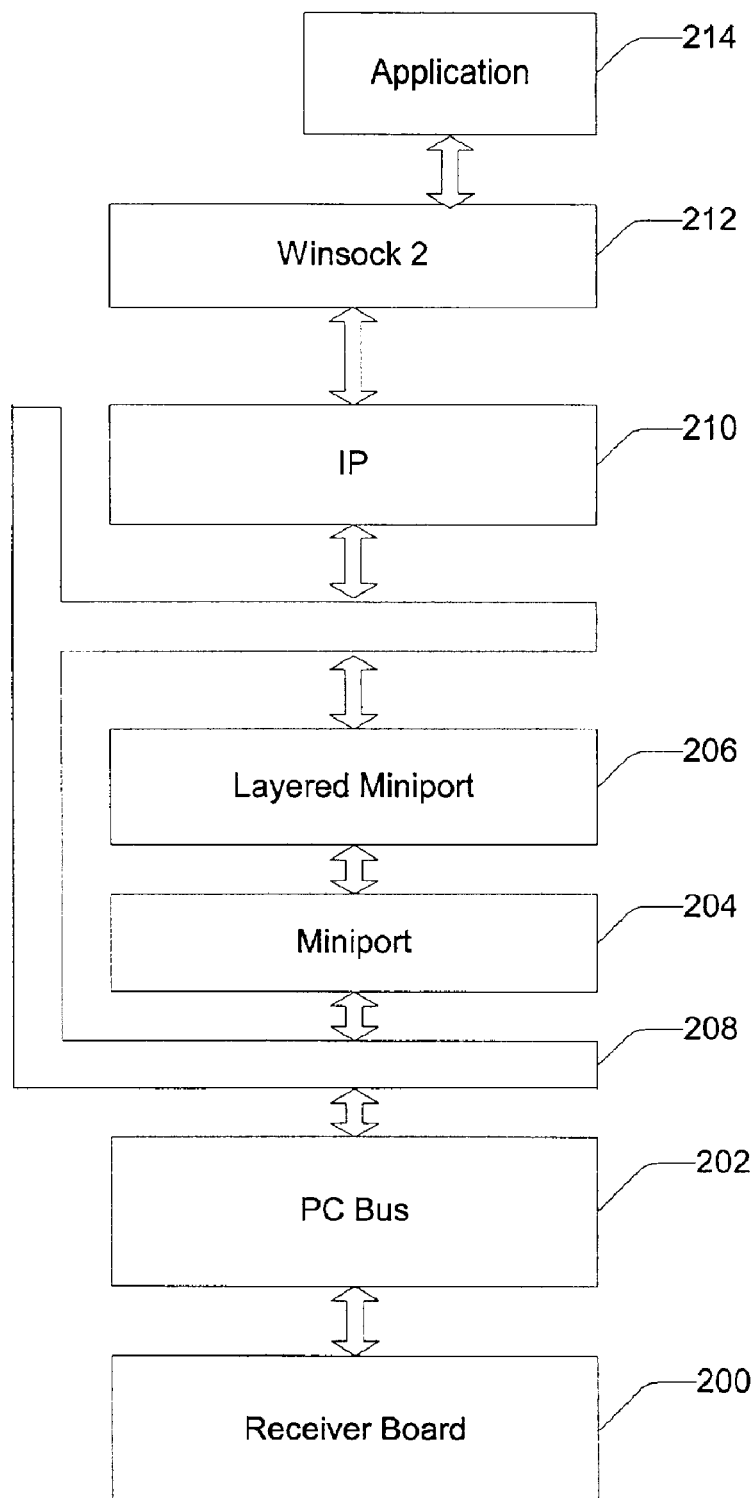
FIG. 7 is a block diagram of a satellite receiver/viewing unit interface which shows data flow of network packets to applications running at the viewing unit.

FIG. 7 shows the interface between the satellite receiver and decoding unit and a software application running on the computer at the visual display unit. A satellite receiver board 200 places the recovered network data packets onto the PC bus 202. A miniport driver 204 and layered miniport driver 206 are coupled to receive the packets from the PC bus 202. In the illustrated example, the drivers comply with the Network Device Interface Specification (NDIS) 4.0, as represented by interface layer 208.

The reassembled network data packet is passed to the IP software interface 210 which performs some rudimentary error checking at the network data packet level (e.g., header checksum) and filtering. At this point, the network data packet is in order to be handled by the Winsock layer 212, a software implemented interface which complies with the Windows Sockets Specification. The Windows Sockets Specification defines a well known standard set of APIs that provide a network independent way to send and receive data. An application 214 uses the network data packets through various API calls orchestrated through the Winsock layer 212.

This invention is beneficial in that it prescribes a technique for transmitting network data over a satellite system without losing its known format. A computer application at the recipient can use standard APIs, such as those prescribed by the Windows Sockets Specification, to access and utilize the network data.

It is noted that aspects of this invention can be used for network types other than satellite networks. The MPT frame and MPT packet structure can be modified for use with other networks, including Ethernet and Internet.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for encoding Internet Protocol (IP) data into a format for transmission over a satellite system, comprising the following steps:

receiving an IP packet having an N-byte IP data block, an A-byte transport protocol header, and a B-byte IP header;

constructing a variable-length multi-packet transport (MPT) frame having an M-byte data payload and a C-byte header;

inserting the entire (N+A+B)-byte IP packet into the M-byte data payload of the MPT frame; and constructing from the (M+C)-byte MPT frame one or more fixed-size multi-byte MPT packets, each MPT packet having at least one header to designate what portion of the MTP frame is contained in the MPT packet.

2. A method as recited in claim 1, further comprising the step of calculating error correction information for the one or more MPT packets.

3. A method as recited in claim 2, further comprising the step of attaching the error correction information as a multi-byte trailer to one of the MPT packets.

4. A method as recited in claim 1, further comprising the step of transmitting the MPT packets.

5. A computer-readable memory having a packet structure that can be encoded into a satellite data packet for transmission over a satellite network, the packet structure comprising:

a data block containing at least a portion of a computer network data packet;

a header positioned before the data block, the header designating whether the portion of the network data packet contained in the associated data block is a starting portion of the network data packet, an ending portion of the network data packet, or a middle portion of the network data packet;

in an event that the data block contains the starting portion of the network data packet, an address header positioned before the data block; and in an event that the data block contains the ending portion of the network data packet, an error correction trailer containing error correction data positioned after the data block.

6. A computer-readable memory as recited in claim 5, wherein the portion header is one byte, the address header is six bytes, and the error correction trailer is four bytes.

* * * * *

UNITED STATES PATENT AND TRADEMARK OFFICE
CERTIFICATE OF CORRECTION

PATENT NO. : 6,993,008 B2  
APPLICATION NO. : 09/755877  
DATED : January 31, 2006  
INVENTOR(S) : Kenneth J. Birdwell et al.

Page 1 of 1

It is certified that error appears in the above-identified patent and that said Letters Patent is hereby corrected as shown below:

On page 2, in field (56), under "Other Publications", in column 1, line 1, delete "interconnections" and insert -- interconnection --, therefor.

In column 2, line 26, after "that" delete "is".

In column 6, line 64, delete "fixed length" and insert -- fixed-length --, therefor.

In column 8, line 66, delete "mult-packet" and insert -- multi-packet --, therefor.

In column 8, line 67, delete "two packet" and insert -- two packets --, therefor.

Signed and Sealed this

Sixth Day of October, 2009

David J. Kappos  
*Director of the United States Patent and Trademark Office*